United States Patent [19]

Schuster et al.

[11] 4,203,352
[45] May 20, 1980

[54] PISTON FOR MULTI-STAGE OPERATION

[76] Inventors: Waldemar Schuster, Grossglocknerstr. 2d, D-8135 Söcking-Gartenstadt; Max G. Hohn, Prinzenweg 5, D-8130 Starnberg, both of Fed. Rep. of Germany

[21] Appl. No.: 817,501

[22] Filed: Jul. 20, 1977

[30] Foreign Application Priority Data

Jul. 9, 1976 [DE] Fed. Rep. of Germany ....... 2631013

[51] Int. Cl.² ............................................. F01B 19/00
[52] U.S. Cl. ........................................ 92/94; 74/18.1; 92/98 R; 92/99
[58] Field of Search ................... 74/18.1, 110; 92/101, 92/103, 98 R, 94, 84, 64, 98; 251/61

[56] References Cited

U.S. PATENT DOCUMENTS

| | | | |
|---|---|---|---|
| 2,242,367 | 5/1941 | Naab | 92/101 |
| 2,315,758 | 4/1943 | Willits | 251/61 |
| 2,371,632 | 3/1945 | Lippincott | 92/98 R |
| 2,919,718 | 1/1960 | Mercier | 92/98 R |
| 2,942,624 | 6/1960 | Good | 92/101 |
| 3,182,566 | 5/1965 | Berg et al. | 92/101 |
| 3,424,062 | 1/1969 | Gummer et al. | 92/101 |
| 3,502,003 | 3/1970 | Dobrikin et al. | 92/101 |

FOREIGN PATENT DOCUMENTS 2289814  10/1975  France ......................................... 92/101

Primary Examiner—Albert W. Davis
Assistant Examiner—Wesley S. Ratliff, Jr.
Attorney, Agent, or Firm—Edmund M. Jaskiewicz

[57] ABSTRACT

A piston is disclosed which is particularly adapted for multi-stage operation in a combined air and spring-loaded brake cylinder. The piston is formed of a resilient or elastic material such as spring steel, a synthetic resin or hard rubber and has a central portion of a reduced wall strength with respect to the surrounding peripheral portion of the piston. The central portion is thus capable of elastic deformation when subjected to a force exceeding a predetermined level. The reduced strength relationship of the central portion may be achieved by a reduced wall thickness, or by the use of radially extending slots. The piston thus has a differential deformability when a pressure is applied thereto such that the entire piston can be shifted as a unit until abutting a stop structure on the housing of the brake cylinder. The central portion of the piston can then be additionally displaced if an increased pressure or force is applied to the central portion.

8 Claims, 5 Drawing Figures

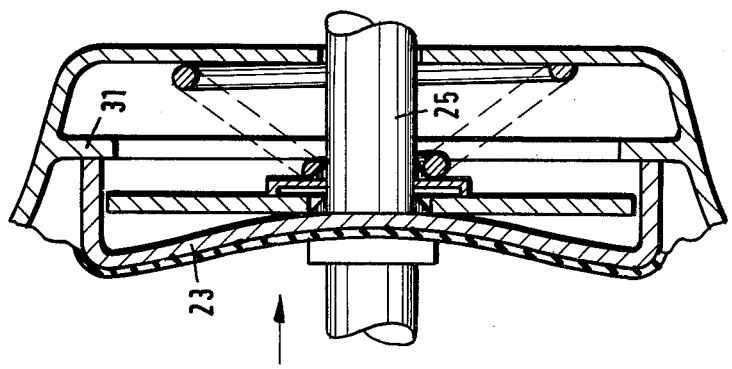
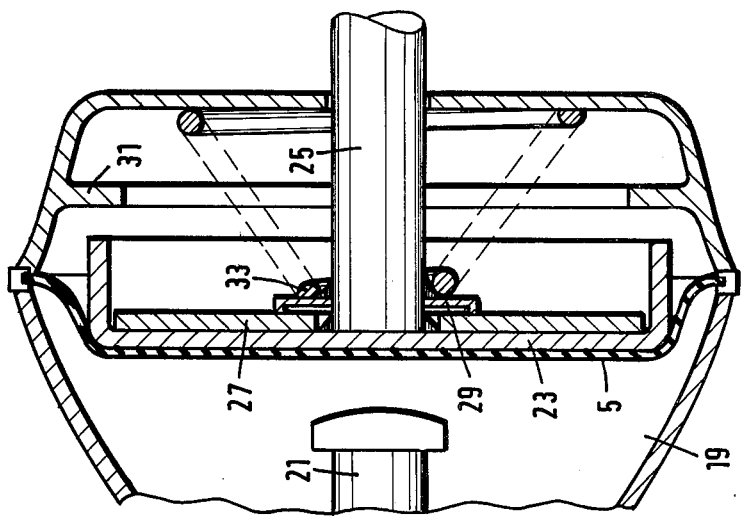

PISTON FOR MULTI-STAGE OPERATION

The present invention relates to a piston for multi-stage operation, more particularly, to such a piston which can be subjected to a force exerted by a fluid pressure medium and also to a force exerted by mechanical means.

Pistons are generally guided within a cylindrical housing and the force exerted by the piston is dependent upon the area of the piston surface and the pressure acting upon the piston surface. In order to obtain a stepped or multi-stage operation the piston can be constructed to act through cams or other elements upon an additional piston. Piston operating structures have been known wherein an annular piston surrounds an inner circular piston and both pistons are displaceable during the normal action of pressure upon the pistons. The inner piston is displaceable an additional amount and separately with respect to the annular piston upon being subjected to a mechanical force such as by a plunger or piston rod.

The above-described piston structure is relatively expensive both with respect to the costs for the coacting structure and manufacturing costs of the piston itself. Accordingly, it has been proposed to utilize a piston which is independent of any guide structure such as a cylindrical wall but has a solid diaphragm interposed with respect to the piston. In such a piston structure an annular piston surrounds a central circular piston in such a manner that both pistons are displaced under the action of the solid diaphragm which contacts both pistons and is subjected to a force applied by a pressure medium. When the outer annular piston abuts a stop on the housing, the inner circular piston can be additionally displaced under the action of a mechanical structure such as by a pressure plate acting on the circular piston through the diaphragm. A piston rod which is connected to the inner piston is thus capable of performing a further stroke in addition to the stroke through which both pistons were displaced. Such a piston structure also requires the utilization of various guides and stops for both of the piston elements in order to obtain reciprocal displacement during the mechanical action on the inner piston element. As a result, such piston structures are also expensive to manufacture and require considerable servicing and maintenance in order to secure the complete operating benefits of such piston structures.

It is therefore the principal object of the present invention to provide a novel and improved multi-stage piston which is simple in structure and reliable in operation without requiring special servicing or maintenance procedures.

It is another object of the present invention to provide such a piston which can be operated in steps or intermittently which is inexpensive to manufacture and has a minimum of structural costs.

According to one aspect of the present invention a piston for multi-stage operation may comprise a peripheral portion surrounding a body portion of a resilient material. The resilient material may comprise a suitable synthetic resin, hard rubber or spring steel. The body portion has a central portion having a reduced strength with respect to the peripheral portion such that the piston has a differential deformability when subjected to pressure. The central portion is elastically deformable when subjected to a force exceeding a predetermined level.

The central portion of the piston is preferably circular in shape and is reduced in wall thickness to such dimensions that the piston will be displaced as a unit when subjected to normal pneumatic or hydraulic pressures. When the periphery of the piston engages a stop attached to the housing, the central portion can be displaced an additional amount if the operational pressure is increased or a mechanical force is exerted on the central portion of the piston. If the central portion of the piston is then connected to a thrust element and a piston rod connected to the thrust element it is possible to displace the piston rod by a so-called overstroke when the central portion of the piston is further subjected to mechanical action.

Other objects and advantages of the present invention will be apparent upon reference to the accompanying description when taken in conjunction with the following drawings, which are exemplary, wherein;

FIG. 3 is a view similar to that of FIG. 2 and showing a further modification of the piston;

FIG. 4 is a view similar to that of FIG. 3 and showing the piston being displaced to that point wherein the central portion of the piston is mechanically operated.

Proceeding next to the drawings wherein like reference symbols indicate the same parts throughout the various views a specific embodiment and modifications of the present invention will be described in detail.

Figure 1:
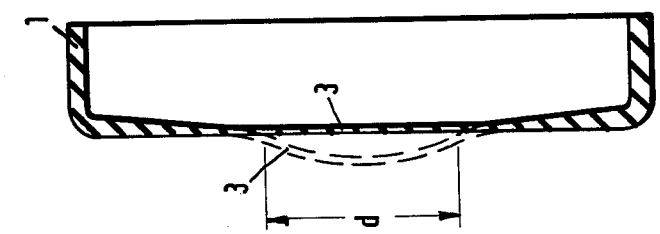
FIG. 1 is a longitudinal sectional view of a piston according to the present invention with a further modification comprising a preformed structure of the central portion being shown in dashed lines.

In FIG. 1 there is illustrated a piston 1 according to the present invention wherein the piston is made of an elastic or resilient material such as spring steel and preferably of rubber or a synthetic resin. The piston 1 is essentially cup-shaped and comprises an axially extending annular member or skirt 2 on the outer periphery of a body portion consisting of a plate or wall having a central portion 3 indicated by the diameter d. The wall thickness of the central portion 3 is less than the wall thickness of the surrounding body portion and peripheral portion. The piston is thus elastically deformable in its central portion 3 if a sufficient pressure is applied to to this central portion and the piston is held stationary at its outer periphery. The piston can thus be operated intermittently or in steps which can be described as multi-stage operation.

As a modification, the central portion of the piston can be preformed to a certain extent as indicated by the dashed lines 3'. This deformation may comprise a bulging or bowing outwardly of the central portion in the direction from which an actuating force is to be applied. If the central portion 3' is thus subjected to the action of pressure exceeding a predetermined level as described above the central portion will be moved to the right to snap into a symmetrical position as illustrated by the solid lines of FIG. 1.

Figure 2:
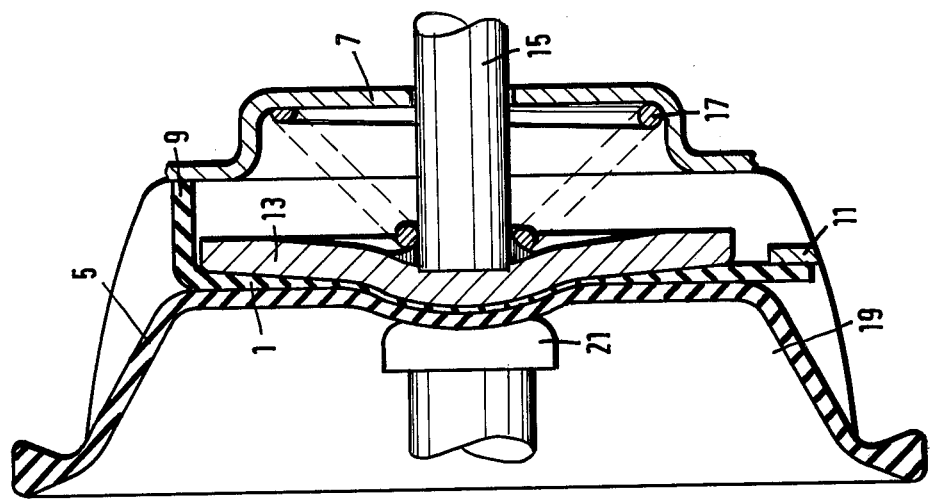
FIG. 2 is a longitudinal sectional view of a piston according to the present invention together with a diaphragm in a combined air and spring-loaded brake cylinder wherein the upper half of the drawing shows a piston with an axially extending skirt and the lower portion of the drawing shows the peripheral portion of the piston engageable with a stop.

The piston 1 as disclosed above in FIG. 1 is capable of many different applications. One such application is illustrated in FIG. 2 wherein the piston 1 is acted upon by a solid diaphragm 5 the outer edge of which is attached in a suitable manner as known in the art to the inner surface of a housing 7, only a portion of which is shown, and which housing may be the housing of a brake cylinder. On its outer periphery the piston comprises an axially extending skirt 9 which also functions as an abutment with respect to the housing as shown in the upper half of FIG. 2. The piston 1 may also be in the form of a plate as shown in the lower half of FIG. 2 the outer periphery of which is engagable with a projection or stop 11 attached to the inner surface of the housing.

The piston 1 acts against a head 13 of a piston rod 15 and the head 13 is held in contact against the piston 1 by a spring 17. When a chamber 19 located to the left of the diaphragm 5 as viewed in FIG. 2 is subjected to the action of pressure, the diaphragm 5 under the action of the pressure will displace piston 1 and piston rod head 13 from a release position, not illustrated, into the position as shown in FIG. 2. In this illustrated position the piston 1 is maintained in a stationary position either by the skirt 9 engaging the housing 7 or its outer periphery engaging the stop 11. The piston was displaced through a particular axial distance under the normal action of a pressure medium in the chamber 19 and the force exerted by the pressure medium was transmitted to the piston rod head 13 and thus to the piston rod 15.

When the piston 1 is maintained in its stationary position as shown in FIG. 2, a plunger 21 on the left side of the diaphragm as shown in FIG. 2 can now become effective. The plunger 21 is axially displaced toward the right by the operating structure of the device in which the piston is being used as may be desired. The plunger 21 thus exerts a pressure through the interposed diaphragm 5 against the central portion 3 of the piston 1 which is provided with the reduced wall thickness. The central portion 3 which could not be deformed under normal operating pressures which originally displaced the piston into the position of FIG. 2 will now bulge out to the right under the effect of the plunger 21. The central portion 3 will thus snap into a symmetrical position. This enables the piston to be subjected to an additional action of pressure in the area of its central portion so as to permit an additional or overstroke through the piston rod head and connected piston rod. Such an overstroke may be employed, for example, in a brake wherein normal braking action initiated by the action of pressure in the chamber 19 is no longer sufficient and an additional stroke or displacement is necessary for operation of the brake.

It is to be borne in mind that it is not necessary to utilize mechanical action on the central portion 3 of the piston as described above. When the pressure in the chamber 19 is sufficiently increased when the piston 1 is being held in its stationary position, this pressure could be sufficient to deform the central portion 3 because of its thinner wall structure to cause the central portion to move to the right as viewed in FIG. 2. This movement of the central portion would also permit the additional or overstroke of the piston rod 15.

Thus, the major portion of the piston surface in the area of its outer periphery is supported or held stationary through suitable abutment structure as described above while the central portion 3 of the piston is freely deformable so that the central portion can be bent upon the application of force or pressure through mechanical or other means.

The piston 1 as shown in FIGS. 1 and 2 is preferably made of an elastic or resilient material such as a hard rubber or synthetic rubber material or of a synthetic resin. Known manufacturing procedures can be utilized to provide a suitable wall thickness for the central portion 3 of the piston.

The central portion may also be provided with a plurality of radial slots extending outwardly from the center thereof so as to provide increased deformability of the central portion with respect to the remaining portion of the piston.

The piston can also be employed without the diaphragm 5 as described above. When the diaphragm is not employed, an annular member or the like can be provided on the outer periphery of the piston in order to provide a sealing engagement or attachment to the inner wall of the housing. The function and operation of the piston remains the same. The central portion of the piston is deformable by an additional stroke under the action of pressure or mechanical structure when the outer periphery of the piston is supported on a stop on the housing or the like. This adaptability significantly increases the possible applications of the piston 1.

In the modification of FIGS. 3 and 4, there is shown a piston 23 similarly constructed of an elastic material, preferably of spring steel, wherein the piston is provided with a relatively thin wall throughout its entire piston surface. Thus, the piston possesses an increased elasticity not only in its central portion but over its entire piston surface. The piston 23 is connected to a piston rod 25 which may be coupled to a brake operating mechanism. The diaphragm 5 is similarly located on the left side of the piston 23 as viewed in FIGS. 3 and 4 and a relatively stiff plate 27 contacts the right side of the piston 23. The plate 27 is supported on its right side by a stop 29 which is attached to the piston rod 25.

When the diaphragm 5 is subjected to the pressure prevailing in the chamber 19, this pressure acts against the entire surface of the piston 23. Because of the high degree of elasticity throughout the entire surface of the piston the piston is able to uniformly contact the plate 27. The plate 27 is positioned in close contact to the piston 23, such as by the use of projecting ribs or small raised portions, and retained by the stop 29 so that pressure acting on the diaphragm 5 is transmitted directly from the piston 23 to the plate 27 and through stop 29 to the piston rod 25. Upon displacement of the piston 23 under the action of the pressure in chamber 19, a skirt on the periphery of the piston will contact a stop 31 attached to the housing. The piston will then be fixed or held stationary in the area of its outer periphery. The elasticity or wall strength of the piston 23 is so selected that the pressure prevailing in chamber 19 is not sufficient to bend or deform the central portion of the piston.

The embodiment of FIGS. 3 and 4 is thus provided with a plunger 21 which can be axially displaced or shifted to the right by any suitable operating structure so as to be able to exert a so-called overstroke on the piston rod 25. When the plunger 21 thus applies a force to the central portion of the piston 23 supported by stop 31 in its stationary position, the central portion of the piston will be elastically deformed so as to bulge or be bowed to the right as shown in FIG. 4. The plate 27 will thus assume the position with respect to piston 23 as shown in FIG. 4 wherein in the area of the stop 29 the plate will perform the same motion as the piston rod 25 while the outer portion of the plate 27 will be separated from the outer portion of the piston which is being held stationary. Since the plate 27 is separated on its outer portion from the inner surface of the piston the plate will not affect the action on the central portion of the piston.

A spring 33 may be provided in the modifications shown in FIGS. 2, 3 and 4 to return the piston rod into its initial position when pressure is relieved in the chamber 19. The modification of FIGS. 3 and 4 may also be utilized on the conventional manner with respect to piston 23 wherein the diaphragm 5 is not used. In such a further modification the piston 23 will slide upon a cylindrical surface and be provided with a sealing ring as known in the art.

Figure 5:
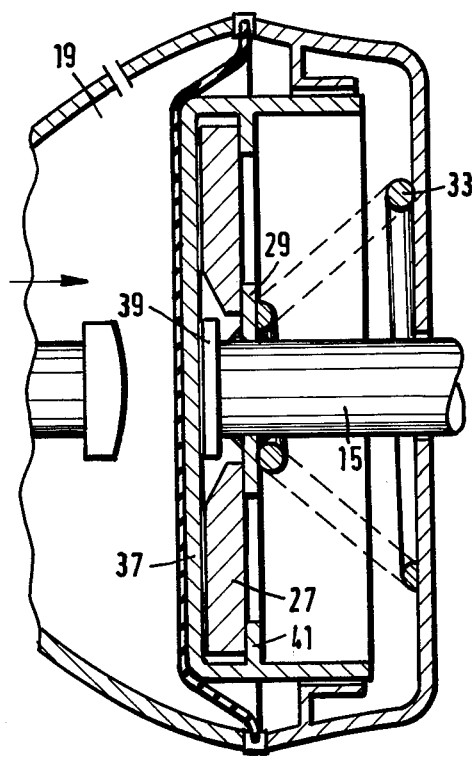
FIG. 5 is a view similar to that of FIG. 2 and showing a still further modification of the present invention.

In FIG. 5, there is illustrated a modification of the piston which can be preferably used in a compressed-air and spring-loaded cylinder. A piston 37 has an inner side which is contacted by a disc or plate 39 which is not connected to the piston but is connected to a piston rod 15. The plate 27 is not only held in position by a stop 29 on the piston rod 15 but also by a stop 41 formed on the piston. Thus, when plunger 21 engages the central portion of the piston the plate 27 will not be displaced with respect to the piston in the manner as disclosed in FIGS. 3 and 4. The piston 37 functions substantially similarly to the modification of FIG. 1 wherein only the central portion of the piston will bulge toward the right when the outer periphery of the piston 37 is supported on a stop or on the housing and the central portion is engaged with sufficient force by the plunger 21. As the central portion of piston 37 is thus bowed outwardly to the right as viewed in FIG. 5, the piston rod 15 which is in contact with the piston will be displaced to the right to perform an overstroke. During this displacement to the right the stop 29 will be separated from plate 27 since the plate 27 is held in position by the stop 41 on the piston. The modification of FIG. 5 can be also used without the diaphragm 5 and the piston 37 can be sealingly guided along a cylindrical wall or surface.

The pistons of the above described modifications can be readily manufactured by procedures known in the art, particularly when the piston is made of a synthetic resin. A piston of synthetic resin can be made by any known injection casting process applicable to synthetic resin or other molding processes suitable for such a purpose. Depending upon the particular conditions or circumstances under which the piston is to be used the piston can be made of hard rubber or similar known materials or of spring steel. Accordingly, the piston of the present invention is very inexpensive to manufacture when compared with the prior art structures utilizing two relatively displaceable separate pistons in order to attain a multi-stage or stepped operation.

Thus it can be seen that the present invention has disclosed a piston for multi-stage operation wherein the central portion of the piston is elastically deformable so as to be deformed at a predetermined force while the adjoining annular outer portion of the piston is relatively rigid. When the piston is supported on its outer periphery, the central portion can be subjected to mechanical action such as through a thrust rod or plunger of a spring-loaded cylinder which acts through the solid diaphragm against the elastically deformable central portion of the piston.

It will be understood that this invention is susceptible to modification in order to adapt it to different usages and conditions, and accordingly, it is desired to comprehend such modifications within this invention as may fall within the scope of the appended claims.

What is claimed is:

1. In a combined air and spring-loaded brake cylinder, the combination of a plunger, a piston having a peripheral portion surrounding a body portion of a resilient material, one side of said body portion being acted upon by one of said plunger and air pressure, a diaphragm between said piston and said plunger, said piston body portion having a central portion which is capable of elastic deformation when subjected to a force exceeding a predetermined level, a pressure plate contacting the other side of said piston, spring means for urging said pressure plate in contact with said piston, and a piston rod to be coupled to a brake operating mechanism and connected to said pressure plate, said piston movable as a unit along a predetermined distance when acted upon by one of said plunger and air pressure to permit additional travel of the plunger upon deformation of said body portion.

2. In a combined air and spring-loaded brake cylinder as claimed in claim 1 wherein said piston central portion is bowed outwardly toward said plunger and said pressure plate conforms in shape to the bowed central portion of said piston and contacts a major portion of the other side of said piston.

3. In a combined air and spring-loaded brake cylinder as claimed in claim 2 wherein said peripheral portion of the piston comprises an axially extending annular member engageable with a housing of the brake cylinder when the piston is displaced.

4. In a combined air and spring-loaded brake cylinder as claimed in claim 1 wherein said central portion has a reduced wall strength with respect to the peripheral portion.

5. In a combined air and spring-loaded brake cylinder as claimed in claim 1 wherein said piston is of a synthetic resin and said body portion comprises a wall, the central portion of said wall having a reduced thickness with respect to the remaining portion of the wall so that said central portion is capable of elastic deformation.

6. In a combined air and spring-loaded brake cylinder as claimed in claim 5 wherein said central portion of the wall is bowed outwardly in the direction from which an actuating force is to be applied when not subjected to a force.

7. In a combined air and spring-loaded brake cylinder as claimed in claim 1 wherein said piston central portion is bowed outwardly toward said plunger.

8. In a combined air and spring-loaded brake cylinder as claimed in claim 1 wherein said body portion comprises a wall having a reduced thickness of the entire piston surface such that said wall is elastically deformable when a predetermined force is exceeded.

* * * * *